United States Patent
Veal (10) Patent No.: US 9,292,213 B2
(45) Date of Patent: Mar. 22, 2016

(54) MAINTAINING AT LEAST ONE JOURNAL AND/OR AT LEAST ONE DATA STRUCTURE BY CIRCUITRY

(71) Applicant: Intel Corporation, Santa Clara, CA (US)

(72) Inventor: Bryan E. Veal, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 224 days.

(21) Appl. No.: 14/079,750

(22) Filed: Nov. 14, 2013

(65) Prior Publication Data

US 2015/0134875 A1 May 14, 2015

(51) Int. Cl.
*G06F 12/00* (2006.01)
*G06F 3/06* (2006.01)
*G06F 12/02* (2006.01)

(52) U.S. Cl.
CPC .............. *G06F 3/0619* (2013.01); *G06F 3/064* (2013.01); *G06F 3/0688* (2013.01); *G06F 3/0689* (2013.01); *G06F 12/0246* (2013.01); *G06F 2212/7201* (2013.01); *G06F 2212/7207* (2013.01); *G06F 2212/7209* (2013.01)

(58) Field of Classification Search
CPC .................... G06F 12/0246; G06F 2212/7201; G06F 2212/7207; G06F 2212/7209; G06F 3/0689
See application file for complete search history.

(56) References Cited

U.S. PATENT DOCUMENTS

2013/0166820 A1* 6/2013 Batwara .............. G06F 12/0246 711/103

OTHER PUBLICATIONS

MD(4), "Multiple Device driver aka Linux Software RAID", Linux man page, Jan. 31, 2014, pp. 1-14. retrieved from http://linux.die.net/man/4/md.
Menon, et al., "The Architecture of a Fault-Tolerant Cached RAID Controller", IEEE, 1993, pp. 76-86.
Bonwick, "RAID-Z" Jeff Bonwick's Blog, Nov. 17, 2005, pp. 1-7. retrieved from https://blogs.oracle.com/bonwick/en_US/entry/raid_z.
Veal et al., "Method and Apparatus for Synchronizing Storage Volumes", U.S. Appl. No. 13/628,257, filed Sep. 27, 2012, 23 pages.

* cited by examiner

*Primary Examiner* — Shawn X Gu
(74) *Attorney, Agent, or Firm* — Christopher K. Gagne (57) ABSTRACT

An embodiment may include circuitry to perform option (a) and/or option (b). In option (a), the circuitry may maintain a journal to record information that is related to a transaction that may result in writing to at least one logical address and at least one physical address of the storage. The information may be recorded in the journal via an atomic operation that may be executed prior to recording, at least in part, the information in a data structure that correlates the at least one logical address to the at least one physical address. In option (b), the circuitry may maintain another data structure that indicates a correlation between at least one other physical address and the at least one logical address. The correlation may be valid prior to completion of the transaction, but the correlation may no longer be valid after the completion.

21 Claims, 4 Drawing Sheets

FIG. 3

MAINTAINING AT LEAST ONE JOURNAL AND/OR AT LEAST ONE DATA STRUCTURE BY CIRCUITRY

TECHNICAL FIELD

This disclosure relates to techniques to maintain at least one journal and/or at least one data structure by circuitry that is to be comprised, at least in part, in storage.

BACKGROUND

In one conventional storage arrangement, a host stores data to and retrieves the data from a redundant array of independent disks (RAID). In the RAID, stripes are distributed across multiple disks of the array. Depending upon the RAID level of the RAID, each of the stripes may include at least one data block and at least one parity block. If a catastrophic event, such as a power failure or system crash, occurs while the blocks are being written into the RAID, the resultant stripe may be placed into an inconsistent state, in which the data and parity blocks are inconsistent with each other. This may result in the data being unrecoverable after catastrophic event.

One proposed solution to this problem is to use a battery-powered volatile write cache to store stripes as they are being written. Other proposed solutions involve the use of non-volatile (e.g., flash) write caches. In the event of power failure, the partially written stripes may be recovered from the cache. Another proposed solution involves configuring the RAID in such a manner that no partial stripe writes are permitted to occur. These proposed solutions tend to be complex and/or expensive to implement and/or maintain. Additionally, these proposed solutions are implemented by the host and/or the host's operating system. This can consume significant amounts of the host's and/or operating system's processing bandwidth, and/or reduce the host's and/or operating system's performance.

Also, in this conventional arrangement, the host and/or host operating system may record recent RAID transactions in a journal. In the event of catastrophic (or other) failure of the RAID, the journal is used by the host and/or host operating system to complete or roll back incomplete transactions, and/or to other maintain the RAID's consistency and/or integrity.

In this conventional arrangement, in order to ensure the integrity and utility of the journal, journal writes are strictly ordered in relation to file system writes. For example, in this conventional arrangement, all journal entries are written before file system metadata writes, with write barriers being imposed between the journal writes and the metadata writes in order to prevent write reordering.

Such conventional journaling techniques can have significant drawbacks and disadvantages. For example, the imposition of such write barriers may reduce system throughput. It may also reduce or eliminate the ability of volatile write caching to be employed, or necessitate flushing of outstanding pending write commands. This can degrade system performance, especially in systems that employ input/output command parallelism (e.g., as is typically the case with solid state drive storage). Additionally, as was discussed previously, these proposed solutions are implemented by the host and/or the host's operating system. This can consume significant amounts of the host's and/or the host operating system's processing bandwidth, and/or reduce the host's and/or the host operating system's performance.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

Description of Embodiments

Figure 1:
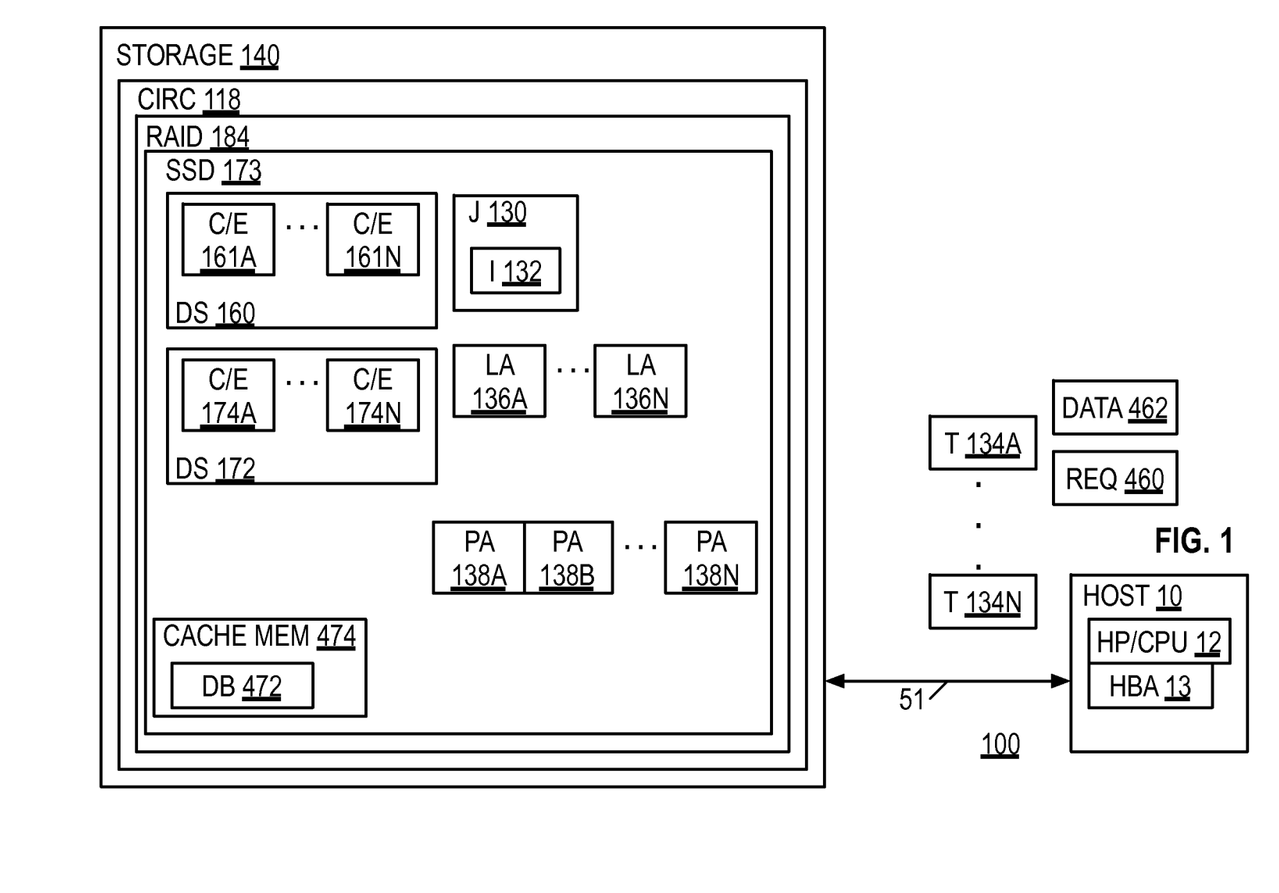
FIG. 1 illustrates features in a system embodiment.

FIG. 1 illustrates a system embodiment 100. System 100 may include one or more hosts 10 and/or storage 140 that may be communicatively coupled together via one or more (and in this embodiment, a plurality of) network communication links 51. One or more hosts 10 and storage 140 may be geographically remote from each other, at least in part, or alternatively, may be comprised, at least in part, in one or more common housings and/or chassis (not shown). In this embodiment, the terms "host computer," "host," "server," "node", and/or "device" may be used interchangeably, and may mean, for example, one or more end stations, smart phones, tablet computers, appliances, intermediate stations, network interfaces, clients, and/or servers, and/or storage and/or mass storage, and/or portions thereof. In this embodiment, a "network" and/or "network communication link" may be used interchangeably, and may be or comprise any mechanism, instrumentality, modality, and/or portion thereof (including, for example, without limitation, one or more wired and/or wireless networks and/or one or more portions thereof) that permits, facilitates, and/or allows, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, a "wireless network" means a network that permits, at least in part, at least two entities to be wirelessly communicatively coupled, at least in part. In this embodiment, a "wired network" means a network that permits, at least in part, at least two entities to be communicatively coupled, at least in part, via non-wireless means, at least in part. In this embodiment, data may be or comprise one or more commands (for example one or more program instructions), and/or one or more such commands may be or comprise data. Also in this embodiment, an "instruction" may include data and/or one or more commands.

In this embodiment, storage 140 may comprise, at least in part, circuitry 118 that may comprise, at least in part, RAID 184. RAID 184 may comprise, at least in part, one or more (and in this embodiment, a plurality of) solid state drives (SSD) 173. Additionally or alternatively, without departing from this embodiment, RAID 184 may comprise one or more hard disk drives (not shown). In this embodiment, storage may comprise circuitry, and/or other components and/or devices that may be capable, at least in part, of storing and/or retrieving data. Also, in this embodiment, mass storage may be or comprise storage that is capable of non-volatile storage of data, and/or from which such data stored therein may be retrieved. Additionally, in this embodiment, a hard disk drive and/or fixed disk drive may be or comprise, for example, one or more platters and/or disks (and/or other circuitry) to and/or from which data may be electrically and/or magnetically stored and/or retrieved, at least in part. Furthermore, in this embodiment, a solid state drive may be or comprise, for example, one or more flash, semiconductor, and/or three dimensional (3D) cross point memory devices such as phase-change memory devices (and/or other circuitry) to and/or from which data may be stored and/or retrieved, at least in part. Although not shown in the Figures, storage 140 and/or RAID 184 may comprise one or more host bus adapters (HBA). Also, without departing from this embodiment, storage 140, RAID 184, and/or SSD 173 each may comprise multiple devices that may be compatible with, at least in part, one more respective communication and/or storage protocols that may differ from each other, at least in part. In this embodiment, a RAID may be or comprise mass storage (and/or other circuitry) in which data and/or parity data may be stored, at least in part, and/or retrieved, at least in part, for example, in accordance with, at least in part, one or more RAID techniques and/or RAID levels. In this embodiment, parity data may be or comprise data (1) generated and/or determined based at least in part upon other data, and/or (2) based at least in part upon which the other data may be generated and/or determined, at least in part. Although not shown in the Figures, storage 140, circuitry 118, RAID 184, and/or SSD 173 may comprise computer-readable/writable memory.

Also, in this embodiment, circuitry 118, RAID 184, and/or SSD 173 may comprise one or more cache memories 474. In operation, one or more cache memories 474 may cache, at least in part, one or more data blocks 472 that, for example, may be, comprise, and/or be related to, at least in part, data to be stored in, retrieved from, and/or related to operation of RAID 184 and/or SSD 173. In this embodiment, a cache memory of an entity may be memory that is capable of operating with higher throughput and/or less latency than other memory of the entity.

Host 10 may comprise, for example, one or more single and/or multi-core host processors (HP)/central processing units (CPU) 12, one or more not shown chipsets, not shown computer-readable/writable memory, and/or one or more HBA 13. The one or more not shown chipsets (which may comprise, e.g., memory and/or input/output controller circuitry) may communicatively couple one or more host processors 12, the not shown computer-readable memory, and/or one or more HBA 13. Alternatively or additionally, although not shown in the Figures, some or all of the circuitry, functionality, and/or components of HBA 13 may be comprised in, for example, one or more host processors 12 and/or one or more not shown chipsets 15. Many other alternatives are possible without departing from this embodiment.

Machine-readable program instructions may be stored in the computer-readable/writable memories that may be comprised in one or more hosts 10, storage 140, circuitry 118, RAID 184, and/or SSD 173. In operation of one or more hosts 10, storage 140, circuitry 118, RAID 184, and/or SSD 173, these instructions may be accessed and executed by one or more host processors 12, HBA 13, storage 140, circuitry 118, RAID 184, and/or SSD 173. When these instructions are so accessed and executed, this may result, at least in part, in one or more hosts 10, host processors 12, storage 140, circuitry 118, RAID 184, and/or SSD 173 performing the operations described herein as being performed by these components of system 100.

In this embodiment, a portion or subset of an entity may comprise all or less than all of the entity. Also, in this embodiment, a stack, process, program, driver, operating system, and/or application may comprise and/or result at least in part from execution of one or more program instructions. In this embodiment, memory may comprise one or more of the following types of memories: semiconductor firmware memory, programmable memory, non-volatile memory, mass storage, read only memory, electrically programmable memory, random access memory, solid state memory, flash memory, magnetic disk memory, optical disk memory, and/or other or later-developed computer-readable and/or writable memory.

As used herein, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, processor core, core, and controller each may comprise respective circuitry capable of performing, at least in part, one or more arithmetic and/or logical operations, such as, for example, one or more respective central processing units. Also in this embodiment, a chipset may comprise circuitry capable of communicatively coupling, at least in part, one or more host processors, storage, mass storage, one or more nodes, and/or memory. Although not shown in the Figures, one or more hosts 10 and/or storage 140 each may comprise a respective graphical user interface system. The not shown respective graphical user interface systems may comprise, e.g., respective keyboards, pointing devices, and display systems that may permit one or more human users to input commands to, and monitor the operation of, one or more hosts 10, storage 140, circuitry 118, RAID 184, SSD 173, and/or system 100.

In operation, one or more hosts 10, one or more HP 12, and/or one or more HBA 13 may exchange data and/or commands with storage 140, circuitry 118, RAID 184, and/or SSD 173 via one or more network communication links 51, in accordance with one or more communication protocols. In this embodiment, a communication protocol may be, comprise, and/or facilitate, at least in part, communication. For example, in this embodiment, such data and/or commands may be comprised in and/or embodied by, at least in part, one or more not shown packets that may be communicated via one or more links 51. In this embodiment, the terms packet and frame may be used interchangeably, and may mean one or more symbols and/or values.

In operation of this embodiment, circuitry 118 may perform one or more operations that may permit, be involved in, and/or facilitate data recovery, at least in part, in event of, for example, catastrophic failure of storage 140, RAID 184, and/or SSD 173. Advantageously, in this embodiment, the performance of these one or more operations may be offloaded completely (or, at least in part) to the circuitry 118 from the one or more hosts 10, host processors 12, and/or HBA 13. For example, in this embodiment, these one or more operations may be or comprise (a) maintaining one or more journals 130 to record information 132, and/or (b) maintaining one or more data structures 172 that may indicate one or more (and, in this embodiment, a plurality of) correlations 174A . . . 174N. For example, in this embodiment, circuitry 118 may maintain and/or store, at least in part, in RAID 184 and/or SSD 173, one or more journals 130, one or more data structures 160, and/or one or more data structures 172. Thus, in operation, one or more journals 130, one or more data structures 160, and/or one or more data structures 172 may be comprised, at least in part, in storage 140, RAID 184, and/or SSD 173.

For example, in this embodiment, storage 140, RAID 184, and/or SSD 173 may comprise and/or be accessible via logical (e.g., block) addresses 136A . . . 136N and/or physical (e.g., block) addresses 138A . . . 138N. One or more hosts 10, host processors 12, and/or HBA 13 may be capable of issuing to storage 140, circuitry 118, RAID 184, and/or SSD 173, via one or more links 51, transactions (e.g., write transactions) 134A . . . 134N that may result in, at least in part, writing to one or more subsets of these logical and/or physical addresses.

By way of example, information 132 may be related, at least in part, to one or more transactions (e.g., 134A). One or more hosts 10, host processors 12, and/or HBA 13 may issue, at least in part, via one or more links 51, to storage 140, circuitry 118, RAID 184, and/or SSD 173, one or more (e.g., write) transactions (e.g., 134A) that may result, at least in part, in writing to one or more logical addresses (e.g., 136A) and/or one or more physical addresses (e.g., 138A) of storage 140, RAID 184, and/or SSD 173. Information 132 may be recorded, at least in part, by circuitry 118, in the one or more journals 130, via one or more atomic operations 152 that may be executed prior to recording, at least in part, the information 132 in one or more data structures 160. In this embodiment, one or more data structures 160 may correlate, at least in part, the one or more logical addresses 136A . . . 136N to the one or more physical addresses 138A . . . 138N. Information 132 may facilitate, at least in part, one or more storage-recovery-related operations. These one or more storage-recovery-related operations may permit, be involved in, and/or facilitate data recovery, at least in part, in event of, for example, catastrophic failure of storage 140, RAID 184, and/or SSD 173.

Also, for example, one or more correlations (e.g., 174A) may be between one or more other physical addresses (e.g., 138B) and one or more logical addresses 136A. One or more correlations 174A may be valid prior to completion of the one or more transactions 134A, but after the completion of the one or more transactions 134A, one or more correlations 174A may no longer be valid.

In this embodiment, a journal may be or comprise, at least in part, at least one data structure in and/or into which data may be recorded, and/or from which such data may be retrieved, at least in part. In this embodiment, the data that may be recorded, at least in part, in a journal, may be or comprise information that may be based upon, relate to, embody, encode, be derived from, be used to reconstruct, be used to recover, and/or be associated with, at least in part, one or more operations. In this embodiment, data may comprise information, and vice versa. Also, in this embodiment, the recording of information may comprise, involve, be, relate to, and/or facilitate, at least in part, storing, at least in part, of the information.

In this embodiment, a physical address may identify, at least in part, one or more physical locations (e.g., into, via, and/or from which data may be stored and/or retrieved, at least in part). Also in this embodiment, a logical address may be or comprise, at least in part, a virtual address that may be associated with, at least in part, one or more physical addresses. In this embodiment, a block address may be identify and/or permit access to, at least in part, a (e.g., predetermined and/or uniformly predefined) unit of data, and may be associated with, for example, a block based storage protocol. In this embodiment, a correlation between or among entities may be or comprise, at least in part, an association between or among the entities. In this embodiment, an atomic operation may comprise a plurality of operations that are executed to completion, as a single transaction, for example, without being interrupted or hindered by, for example, an entity not involved, at least in part, in the atomic operation.

In this embodiment, multiple atomic operations may be employed to maintain and/or update, at least in part, one or more journals 130, one or more data structures 160, and/or one or more data structures 172. For example, one or more write transactions 134A to storage 140 and/or RAID 184 may commence with one or more hosts 10 and/or HBA 13 initiating, at least in part (e.g., in response, at least in part, to one or more write commands issued by one or more host processors 12), one or more write operations 150 (see FIG. 3) that may address, at least in part, one or more logical addresses 136A.

Figure 3:
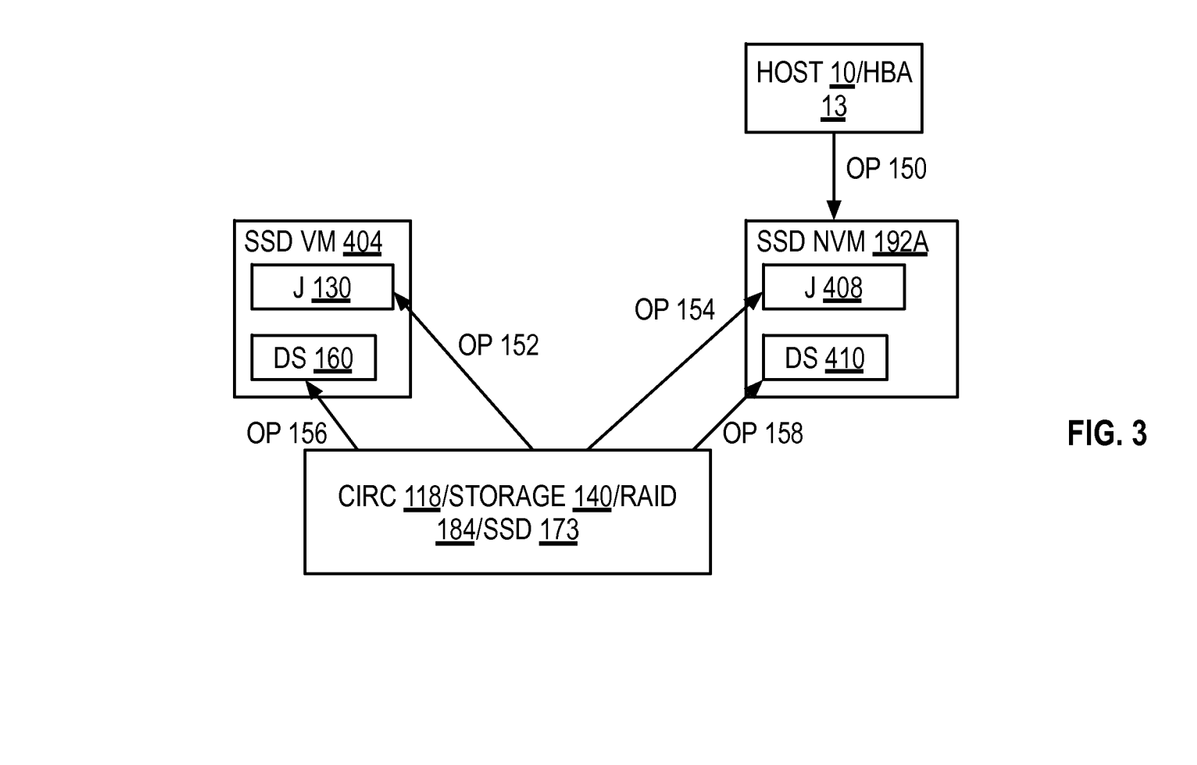
FIG. 3 illustrates features in an embodiment.

In response, at least in part, to the initiation, at least in part, of one or more operations 150, storage 140, circuitry 118, RAID 184, and/or SSD 173 may access one or more address correlations and/or entries (e.g., one or more entries 161A in one or more data structures 160) that may correlate, at least in part, the one or more logical addresses 136A to one or more physical addresses in RAID 184 and/or SSD 173. Based at least in part upon these one or more correlations/entries 161A, storage 140, circuitry 118, RAID 184, and/or SSD 173 may determine, at least in part, that one or more logical addresses 136A are presently validly correlated, at least in part, to one or more physical addresses 138B (e.g., in non-volatile SSD 192A). As a result, storage 140, circuitry 118, RAID 184, and/or SSD 173 may select one or more different physical addresses (e.g., other than the one or more presently correlated physical addresses 138B) 138A to become correlated, at least in part, to one or more logical addresses 136A. This may result, at least in part, in storage 140, circuitry 118, RAID 184, and/or SSD 173 writing, at least in part, the data into one or more physical addresses 138A that are now to become correlated, at least in part, to one or more logical addresses 136A. However, in this embodiment, such writing to one or more physical addresses 138A may only occur after operations 150, 152, 154, 156, and/or 158 have occurred, in order to permit RAID 184, storage 140, and/or SSD 173 to remain in a state in which one or more journals 408 and/or one or more data structures 410 may be advantageously employed for purposes of rolling-back any incomplete transaction so as to protect and/or recover the integrity and/or consistency of the RAID 184, storage 140, and/or SSD 173.

In response to, contemporaneously, before, or after, at least in part, the initiation, at least in part, of these one or more write operations 150, storage 140, circuitry 118, RAID 184, and/or SSD 173 may record information 132, at least in part, in one or more journals 130, via one or more atomic operations 152. These one or more atomic operations 152 may be executed prior to storage 140, circuitry 118, RAID 184, and/or SSD 173 recording, at least in part, via one or more other atomic operations 156, the information 132 in one or more entries 161A of one or more data structures 160.

Figure 4:
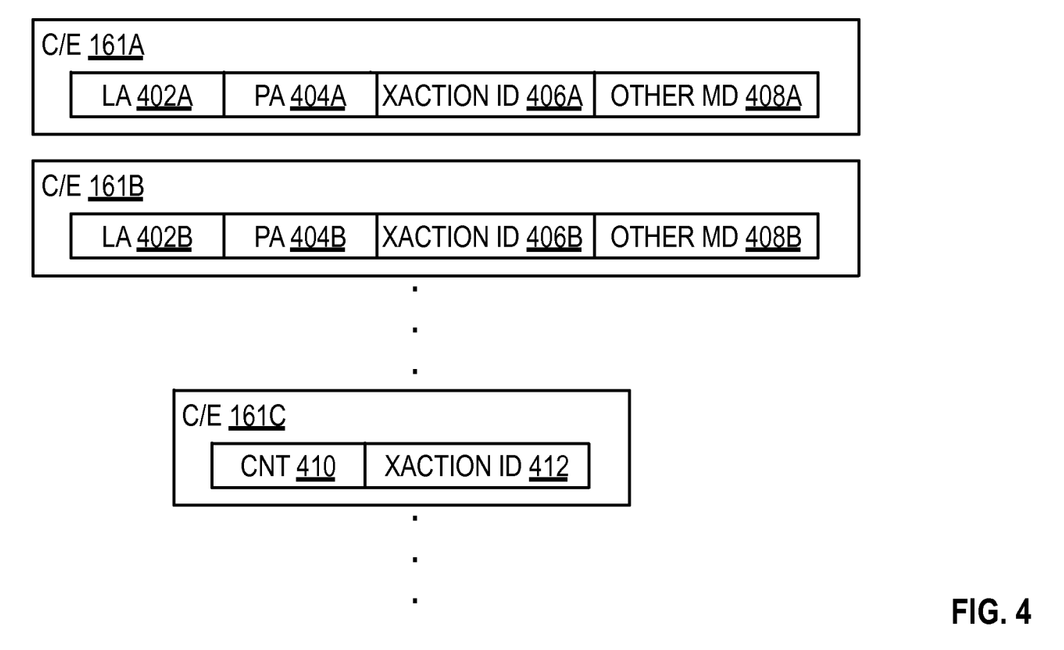
FIG. 4 illustrates features in an embodiment.

For example, as shown in FIG. 3, SSD 173 may comprise, at least in part, one or more volatile SSD memories 404 and/or one or more non-volatile SSD memories (e.g., 192A and/or other SSD comprised in RAID 184). As recorded in one or more journals 130, information 132 may comprise one or more fields of information of one or more entries/correlations that are intended to replace, at least in part, one or more correlations/entries 161A in one or more data structures 160. For example, as shown in FIG. 4, one or more correlations/entries 161A may comprise one or more tuples correlating, at least in part, one or more logical block address fields 402A, one or more physical address fields 404A, one or more transaction identifier fields 406A, and/or one or more other metadata fields 408A. In this example, as stored in one or more journals 130, the one or more fields 402A may indicate and/or comprise, at least in part, one or more addresses 136A, one or more fields 404A may indicate and/or comprise, at least in part, one or more addresses 138A, one or more fields 406A may indicate and/or comprise, at least in part, one or more symbols, values, and/or characters that may be associated with and/or identify, at least in part, one or more transactions 134A, and/or one or more fields 408A may indicate and/or comprise, at least in part, metadata associated with, at least in part, one or more transactions 134A.

Additionally or alternatively, this metadata may comprise, at least in part, cache metadata that may describe, at least in part, one or more data blocks 472 cached in the cache memory 474 (e.g., in the case that one or more data blocks 472 comprise, at least in part, the data written as a result of one or more transactions 134A). For example, such cache metadata may describe validity, dirtiness, RAID/storage/SSD physical/logical addresses, etc. of one or more data blocks 472. In this additional or alternate arrangement, although not shown in the Figures, the cache metadata may be stored, together with other cache metadata associated with other not shown data blocks stored in cache 474, in one or separate entries in one or more journals 130 and/or one or more copies 408 thereof. In this arrangement, the one or more cached data blocks 472 may be written into storage 140, RAID 184, and/or SSD 192A prior to their associated cache metadata being recorded in the one or more journals 130 and/or copies 408 thereof. Thus, in this arrangement, if a cache metadata entry is present in one or more journals 130 and/or copies 408 thereof, the one or more cached data blocks associated with that entry have already been written into storage 140, RAID 184, and/or SSD 192A.

After information 132 has been recorded, at least in part, into one or more journals 130, via one or more atomic operations 152, circuitry 118, storage 140, RAID 184, and/or SSD 173 may commit (e.g., record), at least in part, one or more copies of that information 132 in one or more copies 408 of one or more journals 130 in one or more non-volatile SSD 192A. That is, for example, circuitry 118, storage 140, RAID 184, and/or SSD 173 may maintain, at least in part, in one or more non-volatile SSD 192A, one or more copies 408 of one or more journals 130.

After information 132 has been copied into one or more copies 408 of one or more journals 130, circuitry 118, storage 140, RAID 184, and/or SSD 173 may record, at least in part, information 132 into one or more data structures 160 (e.g., which may be stored, at least in part, in volatile SSD memory 404), via one or more atomic operations 156. In this example, as recorded, at least in part, in one or more data structures 160, information 132 may overwrite, at least in part, one or more correlations/entries 161A in one or more data structures 160. Thereafter, after this overwriting, in one or more correlations 161A in one or more data structures 160, one or more logical addresses 136A may be correlated, at least in part, with one or more physical addresses 138A, instead of being correlated, at least in part, with one or more physical addresses 138B (as was previously the case).

After information 132 has overwritten, at least in part, one or more correlations/entries 161A in one or more data structures 160, circuitry 118, storage 140, RAID 184, and/or SSD 173 may update, at least in part, via one or more atomic operations 158, one or more copies 410 of one or more data structures 160 in one or more non-volatile SSD 192A, so as to reflect the changes that have been made to one or more data structures 160. That is, for example, circuitry 118, storage 140, RAID 184, and/or SSD 173 may maintain, at least in part, in one or more non-volatile SSD 192A, one or more copies 410 of one or more data structures 160. After one or more operations 150, 152, 154, 156, and/or 158 have been completed, the data requested to be written by the initiation of one or more transactions 134A may be written into storage 140, RAID 184, and/or one or more SSD 173.

In this embodiment, if the one or more journals 130 and/or the one or more data structures 160 comprise and/or indicate, at least in part, a particular physical address, then this may act to prevent, at least in part, reclamation, reuse, and/or overwriting of that particular physical address by, for example, circuitry 118, storage 140, RAID 184, and/or SSD 173. However, if such reference to the particular physical address is subsequently removed, then this may permit circuitry 118, storage 140, RAID 184, and/or SSD 173 to be able to reclaim, reuse, and/or overwrite, at least in part, the particular physical address.

In this embodiment, the principles, operations, and/or techniques described herein concerning operations 150, 152, 154, 156, and/or 158, in relation to one or more write transactions 134A directed to one or more SSD 192A, may be applied in analogous fashion to all of the SSD that may be comprised in the storage 140 and/or RAID 184. Thus, for example, each respective SSD that may be comprised in storage 140 and/or RAID 184 may comprise one or more respective journals, data structures, and/or copies thereof, etc. whose construction and/or operation may be analogous to those of one or more journals 130, data structures 160, and/or copies 408, 410 thereof, etc. Each of these respective journals, data structures, and/or copies thereof, etc. in these respective SSD may be devoted to recording respective information/correlations/entries associated with respective logical addresses and/or physical addresses associated with these respective SSD, and/or respective transactions that may access such respective addresses.

In the event of catastrophic system failure, the ordinary sequence of operations 150, 152, 154, 156, and/or 158 may be interrupted, at least in part, and/or any correlations/entries that may have been recorded in one or more journals 130 and/or data structures 160, but not committed into one or more copies 408 and/or 410, respectively, may be lost. Consequently, in the event of such system failure, instead of continuing the ordinary sequence of such operations, circuitry 118, storage 140, RAID 184, and/or SSD 173 may enter a recovery mode of operation that is directed to implementing one or more storage-recovery-related operations.

In the recovery mode of operation, circuitry 118, storage 140, RAID 184, and/or SSD 173 may permit one or more hosts 10 and/or HBA 13 to be able to issue to circuitry 118, storage 140, RAID 184, and/or SSD 173 one or more recovery-related commands/requests 460 (see FIG. 1). These one or more requests may be implemented, for example, as one or more communication protocol-based commands, one or more proprietary commands (e.g., to read one or more out-of-bounds and/or negative logical addresses), read/get log commands, and/or other type of command/request. The one or more requests 460 when executed, may result, at least in part, in circuitry 118, storage 140, RAID 184, and/or SSD 173 retrieving, at least in part, for use by the one or more hosts 10 and/or HBA 13, (1) an identification of (and/or one or more of the fields comprised in) any correlations/entries in the one or more journals 408, and/or one or more data structures 160 and/or 410, and/or (2) data 462 referenced/addressed by one or more logical and/or physical address fields of any such correlations/entries. Additionally or alternatively, one or more requests 460 when executed, may result, at least in part, in circuitry 118, storage 140, RAID 184, and/or SSD 173 committing one or more correlations/entries of the one or more journals 408 to the one or more data structures 160 and/or 410. Additionally or alternatively, these one or more requests 460 when executed, may result, at least in part, in circuitry 118, storage 140, RAID 184, and/or SSD 173 erasing one or more entries from the one or more journals 408, and/or exiting the recovery mode of operation.

In this embodiment, one or more journals 130 and/or 408 may be advantageously employed in a manner that may obviate use by the one or more hosts 10 and/or HBA 13 of write-intent logs and/or dirty stripe journals to track recently-written stripes of RAID 184. For example, in this embodiment, information related to a host-initiated write transaction to storage 140, RAID 184, and/or SSD 173 may be recorded in one or more journals 130 and/or 408 before (1) that information is recorded in one or more data structures 160 and/or 410, and/or (2) the data sought to be written by the transaction is actually written into the storage 140, RAID 184, and/or SSD 173. As a result, in the event of catastrophic failure, the data will not be written into the storage 140, RAID 184, and/or SSD 173 unless one or more corresponding entries have not already been written into the one or more journals 408. When in recovery mode of operation, in order to restore and/or recover stripe consistency of storage 140, RAID 184, and/or SSD 173, circuitry 118, storage 140, RAID 184, and/or SSD 173 may retrieve, at least in part, the logical and/or physical addresses recorded in each of the entries/correlations of the copies of the journals in the non-volatile SSD in the storage 140, RAID 184, and/or SSD 173. Based at least in part upon these addresses, circuitry 118, storage 140, RAID 184, and/or SSD 173 may determine, at least in part, each of the RAID stripes in RAID 184 that may correspond, at least in part, to these addresses. Circuitry 118, storage 140, RAID 184, and/or SSD 173 then may determine whether the respective data and parity information of each of these stripes is consistent with each other. For each respective stripe that is determined to be inconsistent, circuitry 118, storage 140, RAID 184, and/or SSD 173 may commit unrecorded entries/correlations from the one or more associated journals in the respective SSD to the associated copies of the associated data structures, and may restore stripe consistency by modifying the respective parity information of the respective stripe so as to be consistent with the respective data with which the respective parity information is associated. Advantageously, this may permit such consistency to be achieved, in this embodiment, following catastrophic failure, without having to check all of the logical/physical addresses and/or stripes in the circuitry 118, storage 140, RAID 184, and/or SSD 173, since, in this embodiment, any logical/physical address and/or stripe that may need to be checked for consistency has been recorded in the copies of the journals prior to such failure.

In the case of cache metadata, one or more requests 460, when executed, may result, at least in part, in retrieval of the cache metadata from one or more copies of one or more journals 408 when the data associated with such metadata is being read from the storage 140, RAID 184, and/or SSD 192A. During recovery mode, appropriate unrecorded metadata entries may be recorded in the one or more data structures 160, 410.

Additionally or alternatively, the one or more journals 130 and/or one or more copies 408 thereof may be advantageously employed in this embodiment so as to permit the host's employment of file system journaling to be obviated. For example, as stated previously, in this embodiment, entries/correlations in the one or more journals 130 may comprise one or more respective transaction identifiers. However, at least one or more certain entries/correlations in the one or more journals 130 may constitute and/or embody commit record entries whose respective fields may different, at least in part, from those of other types of correlations/entries in one or more journals 130. For example, as shown in FIG. 4, one or more commit record entries 161C may comprise one or more count fields 410 and/or one or more transaction identifier fields 412. In contrast, one or more correlations/entries 161B may comprise respective fields 402B, 404B, 406B, and/or 408B whose purpose and/or information contents may be analogous to those of respective fields 402A, 404A, 406A, and/or 408A of one or more correlations/entries 161A discussed previously. In this example, multiple entries (e.g., 161A, 161B, and/or 161C) in the one or more journals 130 may be associated with multiple transactions (e.g., 134A and/or 134N) involving storage 140 and/or RAID 184 that may be associated with the same (i.e., identical) respective transaction identifier. By way of example, each of these multiple transactions 134A and/or 134N may have been requested, at least in part, by, on behalf of, and/or whose results may be intended to be processed (e.g., as a group or single logical entity) by, one or more common entities (e.g., one or more not shown identical and/or associated processes). Accordingly, these transactions 134A and/or 134N may have been assigned a single common transaction identifier. Therefore, fields 406A and 406B may have the same information contents. As part of one or more operations 150, the one or more transaction requests issued by one or more hosts 10 and/or HBA 13 may comprise and/or indicate, at least in part, the total number of transactions that are to assigned this common transaction identifier. In this embodiment, as each of the entries/correlations 161A, 161B is recorded in the one or more journals 130, the one or more count fields 410 of the one or more commit record entries/correlations 161C may be updated (either by counting down from the total number of assigned transactions or by counting down therefrom) to appropriately reflect the number of entries/correlations that have so far been recorded in the one or more journals 130. In the case of such multiple transactions being assigned a common transaction identifier, circuitry 118, storage 140, RAID 184, and/or SSD 173 may not update one or more data structures 160 and/or one or more copies 410 thereof to reflect any of these transactions until the one or more count fields 410 reflect that all of these multiple transactions 134A, 134N have corresponding entries/correlations 161A, 161B in the one or more journals 130 and/or 408. When one or more count fields 410 reflect that all of these multiple transactions 134A, 134N have such corresponding entries 161A, 161B, the one or more data structures 160 and/or 410 may be updated in one or more batch transactions to reflect all of the corresponding entries 161A, 161B and/or 161C. At least when thus reflected in one or more data structures 160 and/or 410, one or more fields 410 may constitute a count of committed ones of the multiple transactions that have the common transaction identifier.

In the recovery mode, one or more requests 460, when executed, may result in circuitry 118, storage 140, RAID 184, and/or SSD 173 retrieving, at least in part, one or more copies 408 of one or more journals 130, including all of the one or more transaction identifiers 406A, 406B, and/or 412, and/or commit record entries 161C. For any transaction identifier whose associated entries/correlations and/or count field indicate that all of the requested transactions associated with the identifier are reflected in the one or more copies 408, one or more hosts 10 and/or HBA 13 may request that the circuitry 118, storage 140, RAID 184, and/or SSD 173 commit these associated entries/correlations to the one or more data structures 160 and/or 410. Conversely, for any transaction identifier whose associated entries/correlations and/or count field indicate that not all of the requested transactions associated with the identifier are reflected in the one or more copies 408, one or more hosts 10 and/or HBA 13 may discard (e.g., flag for erasure and/or reuse) the one or more associated commit record entries (e.g., 161C). This may leave unmodified any associated file system metadata in order to maintain consistency.

Figure 2:
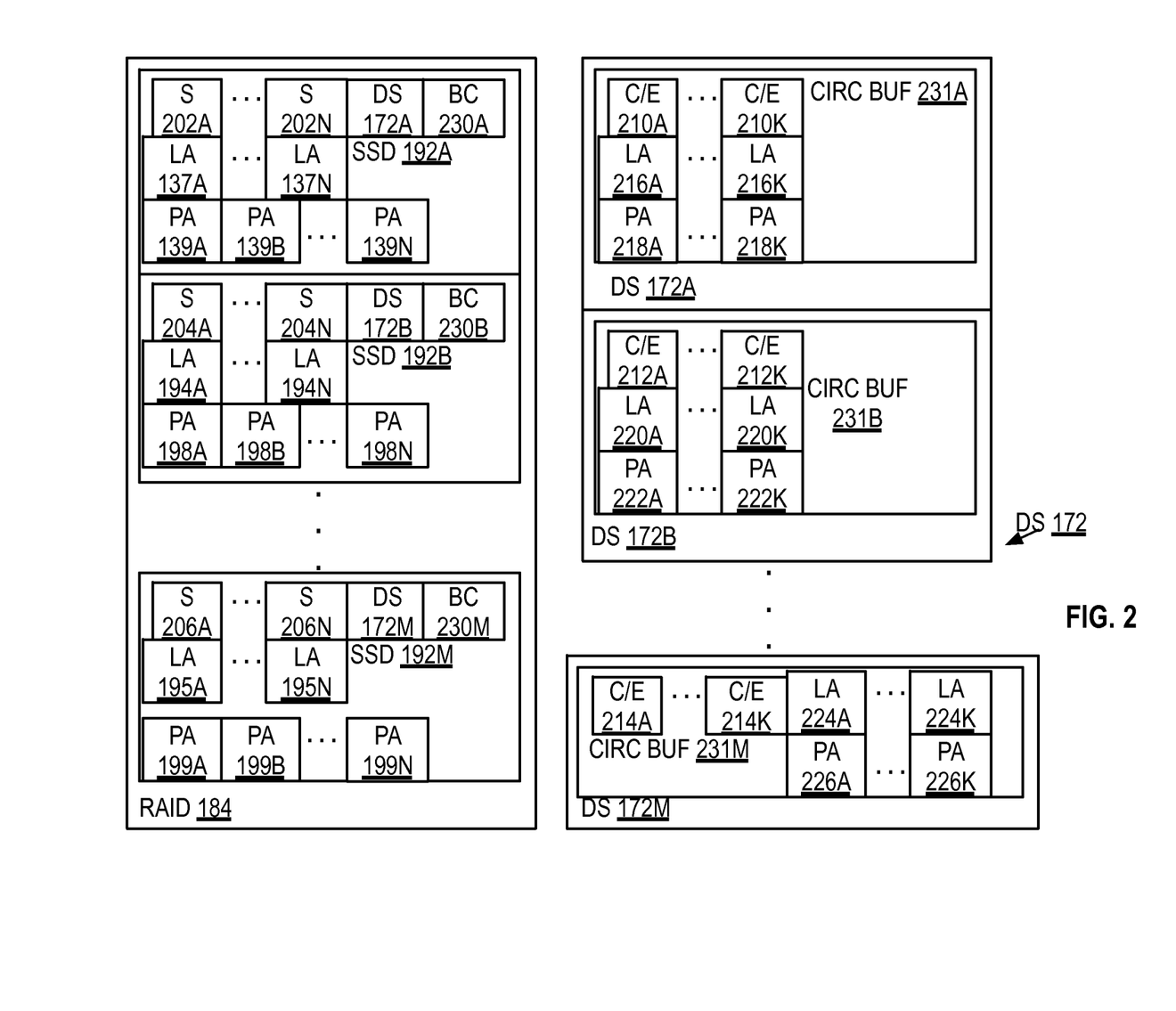
FIG. 2 illustrates features in an embodiment.

Additionally or alternatively, as stated previously, circuitry 118 may maintain one or more other data structures 172. One or more other data structures 172 may comprise and/or indicate, at least in part, one or more correlations (e.g., 174A) between one or more physical addresses 138B and/or one or more logical addresses 136A that were valid prior to the completion of one or more transactions 134A, but are no longer valid after the completion of the one or more transactions 134A. For example, as shown in FIG. 2, RAID 184 and/or SSD 173 may comprise multiple (e.g., non-volatile) SSD 192A, 192B, . . . 192M that may implement and/or embody, at least in part, the RAID 184. Thus, for example, the number of SSD 192A . . . 192M that may be comprised in RAID 184 may differ, without departing from this embodiment, depending upon the specifics of the RAID level and/or techniques implemented in and/or by RAID 184.

SSD 192A . . . 192M may comprise and/or be accessible via respective sets of logical and physical addresses. For example, SSD 192A may comprise and/or be accessible via one or more sets of logical addresses 137A . . . 137N and/or one or more sets of physical addresses 139A . . . 139N. Also, for example, SSD 192B may comprise and/or be accessible via one or more sets of logical addresses 194A . . . 194N and/or one or more sets of physical addresses 198A . . . 198N. Also, for example, SSD 192M may comprise and/or be accessible via one or more sets of logical addresses 195A . . . 195N and/or one or more sets of physical addresses 199A . . . 199N.

In this embodiment, in the RAID 184, the respective stripes of the respective SSD 192A . . . 192M may correspond, be correlated to, and/or be accessible (e.g., by host 10 and/or HBA 13) via, at least in part, the respective logical addresses of the respective SSD 192A . . . 192M. For example, in SSD 192A, stripes 202A . . . 202N may correspond, be correlated to, and/or be accessible via logical addresses 137A . . . 137N, respectively. Also, for example, in SSD 192B, stripes 204A . . . 204N may correspond, be correlated to, and/or be accessible via logical addresses 194A . . . 194N, respectively. Also, for example, in SSD 192M, stripes 206A . . . 206N may correspond, be correlated to, and/or be accessible via logical addresses 195A . . . 195N, respectively.

In this embodiment, respectively identical logical addresses of the respective SSD 192A . . . 192M may correspond, at least in part, to respective identical (e.g., logical) stripes across the RAID 184. Thus, for example, if logical addresses 137A, 194A, and 195A are identical to each other, then they all correspond to, address, and/or permit access to, the same (e.g., logical) stripe (e.g., which logical stripe comprises stripes 202A, 204A, and 206A) of the RAID 184. Analogously, if logical addresses 137N, 194N, and 195N are identical to each other, then they all correspond to, address, and/or permit access to, the same (e.g., logical) stripe (e.g., which logical stripe comprises stripes 202N, 204N, and 206N) of the RAID 184.

In this embodiment, one or more data structures 172 and its one or more correlations 174A . . . 174N may be distributed, at least in part, in and/or across the SSD 192A . . . 192M of RAID 184. For example, as shown in FIG. 2, one or more data structures 172 may comprise respective data structures 172A . . . 172M comprised and/or stored in respective SSD 192A . . . 192M. The respective data structures 172A . . . 172M may comprise and/or indicate, at least in part, respective correlations/entries between respective subsets of the respective sets of logical and physical addresses of the respective SSD 192A . . . 192M.

For example, as shown in FIG. 2, one or more data structures 172A may be stored and/or comprised, at least in part, in one or more SSD 192A, one or more data structures 172B may be stored and/or comprised, at least in part, in one or more SSD 192B, and/or one or more data structures 172M may be stored and/or comprised, at least in part, in one or more SSD 192M, respectively. One or more data structures 172A may comprise, at least in part, one or more circular buffers 231A that may comprise, at least in part, one or more (and in this embodiment, a plurality of) correlations/entries 210A . . . 210K. One or more data structures 172B may comprise, at least in part, one or more circular buffers 231B that may comprise, at least in part, one or more (and in this embodiment, a plurality of) correlations/entries 212A . . . 212K. One or more data structures 172M may comprise, at least in part, one or more circular buffers 231M that may comprise, at least in part, one or more (and in this embodiment, a plurality of) correlations/entries 214A . . . 214K.

Correlations/entries 210A . . . 210K in one or more data structures 172A may comprise and/or indicate, at least in part, correlations between one or more respective subsets of the logical and physical addresses (e.g., comprising logical addresses 216A . . . 216K and/or physical addresses 218A . . . 218K) of the one or more SSD 192A that may comprise the one or more data structures 172A and/or correlations 210A . . . 210K. Analogously, correlations/entries 212A . . . 212K in one or more data structures 172B may comprise and/or indicate, at least in part, correlations between one or more respective subsets of the logical and physical addresses (e.g., comprising logical addresses 220A . . . 220K and/or physical addresses 222A . . . 220K) of the one or more SSD 192B that may comprise the one or more data structures 172B and/or correlations 212A . . . 212K. Also, analogously, correlations/entries 214A . . . 214K in one or more data structures 172M may comprise and/or indicate, at least in part, correlations between one or more respective subsets of the logical and physical addresses (e.g., comprising logical addresses 224A . . . 224K and/or physical addresses 226A . . . 226K) of the one or more SSD 192M that may comprise the one or more data structures 172M and/or correlations 214A . . . 214K. Thus, in this embodiment, for and in each respective SSD 192A . . . 192M, the respective subsets of the respective sets of physical and logical addresses in the respective SSD 192A . . . 192M are indicated in the one or more respective circular buffers 231A . . . 231M as being correlated to each other.

In this embodiment, each of the one or more respective circular buffers 231A . . . 231M in the respective SSD 192A . . . 192M may have a respective number of entries/correlations that may be greater than or equal to the largest/maximum respective permitted and/or expected number of contemporaneous outstanding (e.g., in-flight and/or pending) write transactions that are to be made that involve the respective SSD 192A . . . 192M. For purposes of illustration, if the largest/maximum permitted and/or expected number of contemporaneous outstanding write transactions that involve SSD 192A is equal to the integer X, then the number Q of entries/correlations 210A . . . 210K that may be comprised in one or more circular buffers 231A and/or data structures 172A may be greater than or equal to X (e.g., $Q \geq X$). Similar and/or analogous parameters may be imposed, in this embodiment, with the respect to the respective numbers of entries/correlations that may be comprised in one or more circular buffers 231B . . . 231M. When the maximum number of contemporaneous write transactions for a particular SSD is reached, the host 10 and/or HBA 13 may finish all outstanding write transactions to a particular (e.g., logical) stripe before additional write transactions (e.g., to another logical stripe) may be issued. Advantageously, these parameters may be imposed in order to permit the respective numbers of entries/correlations in the circular buffers 231A . . . 231M to be sufficient large to permit, for example, at least one entire logical stripe to be written before (as will described hereafter) one or more particular ones of the correlations/entries that are associated with the stripe to be erased.

In this embodiment, circuitry 118, storage 140, RAID 184, and/or SSD 173 may maintain, at least in part, until released to be overwritten, at least in part, for and in each respective drive, backup copies 230A . . . 230M of data stored in the respective subsets of the respective sets of physical addresses that were previously indicated, in the data structures 172A . . . 172M, as being correlated to the respective subsets of the respective sets of logical addresses. Advantageously, in this embodiment, this may permit circuitry 118, storage 140, RAID 184, and/or SSD 173 to be able to revert to these backup copies 230A . . . 230M in the event that a catastrophic failure leaves one or more of the stripes 202A . . . 202N, 204A . . . 204N, . . . 206A . . . 206N in a state that is inconsistent with the one or more others of the stripes with which the one or more of the stripes may be associated. In this embodiment, associated stripes may be considered to be consistent if the RAID parity block comprised in the associated stripe can be re-computed and/or re-generated based, at least in part, upon the data in the other blocks comprised in the same stripe and one or more appropriate RAID parity calculations (e.g., for and/or as employed in the RAID 184).

For example, in this embodiment, each SSD 192A . . . 192M comprises and/or stores respective backup copies 230A . . . 230M of the data blocks that are stored at the respective sets of physical addresses indicated, at least in part, in the respective correlations/entries in the respective circular buffers 231A . . . 231M and/or data structures 172A . . . 172M stored in the SSD 192A . . . 192M. Thus, for example, SSD 192A may store backup copies 230A of the data blocks stored at physical addresses 218A . . . 218K. Also, for example, SSD 192B may store backup copies 230B of the data blocks stored at physical addresses 222A . . . 222K. Also, for example, SSD 192M may store backup copies 230M of the data blocks stored at physical addresses 226A . . . 226K.

In this embodiment, the correlations/entries comprised in the respective data structures 172A . . . 172M may correlate respective logical addresses to the respective physical addresses with which the respective logical addresses were most recently last correlated in the one or more data structures 160, prior to the respective logical addresses having been last overwritten. For example, as stated previously, with reference to FIG. 1, one or more write transactions 134A may write new data into one or more logical addresses 136A. Prior the writing of this new data, one or more logical addresses 136A may be correlated, in one or more entries/correlations 161A in one or more data structures 160, with one or more physical addresses 138B. However, after or contemporaneously, at least in part, with the writing of this new data, circuitry 118, storage 140, RAID 184, and/or SSD 173 may update/modify/overwrite, at least in part, one or more entries/correlations 161A in one or more data structures 160 such that one or more logical addresses 136A may be correlated, in one or more entries 161A, to one or more different physical addresses 138A.

However, in accordance with this embodiment, prior to so updating/modifying/overwriting, at least in part, one or more correlations/entries 161A, the one or more correlations/entries 161A may be at least temporarily added, for example, as one or more entries/correlations 174A to one or more data structures 172. Thus, prior to the completion of the one or more write transactions 134A, one or more correlations 174A may be valid, but after such completion, one or more correlations 174A may no longer be valid.

For example, returning to FIG. 2, one or more logical addresses 136A may correspond, at least in part, to logical addresses 137A, 194A, . . . 195A in SSD 192A, 192B, . . . 192M, respectively. Prior to the completion of one or more write transactions 134A, logical addresses 137A, 194A, . . . 195A may be correlated, in one or more data structures 160, to physical addresses 139B, 198B, . . . 199B in SSD 192A, 192B, . . . 192M (i.e., one or more physical addresses 138B may correspond, at least in part, to physical addresses 139B, 198B, . . . 199B in SSD 192A, 192B, . . . 192M). However, one or more physical addresses 138A may correspond, at least in part, to physical addresses 139A, 198A, . . . 199A in SSD 192A, 192B, . . . 192M. Accordingly, prior to updating/modifying/overwriting, at least in part, one or more entries/correlations 161A in one or more data structures 160, circuitry 118, storage 140, RAID 184, and/or SSD 192A . . . 192M may add (e.g., overwrite) entries 210A, 212A, . . . 214A at the respective heads of circular buffers 231A, 231B, . . . 231M in data structures 172A, 172B, . . . 172M. More specifically, for example, one or more entries 210A may be overwritten so as to correlate therein one or more logical addresses 137A to one or more physical addresses 139B. Also, for example, one or more entries 220A may be overwritten so as to correlate therein one or more logical addresses 194A to one or more physical addresses 198B. Also, for example, one or more entries 214A may be overwritten so as to correlate therein one or more logical addresses 195A to one or more physical addresses 199B.

In this example, after entries 210A, 212A, . . . 214A have been overwritten, the data blocks stored in physical addresses 139B, 198B, . . . 199B have not yet been released to be overwritten. Advantageously, prior to these data blocks being so released, these entries 210A, 212A, . . . 214A effectively indicate where backup copies (e.g., that may be comprised in backup copies 230A, 230B, . . . 230M) of these data blocks may be found, as well as, their respective previous logical address correlations, in the event that one or more transactions 134A are not properly completed (e.g., in the event of catastrophic failure). In this embodiment, when a particular physical address is no longer found in any of the data structures 172A . . . 172M, that physical address may be reclaimed, made available for reuse, erased, overwritten, etc. This may result from, for example, the overwriting of the entry or entries that contain the particular physical address as a result of the head pointer overwrapping the entry or entries in the pertinent circular buffer.

In the recovery mode, one or more requests 460, when executed, may result in circuitry 118, storage 140, RAID 184, and/or SSD 192A . . . 192M (1) retrieving, examining, and/or providing, at least in part, to one or more hosts 10 and/or HBA 13 one or more data structures 172, and/or 172A . . . 172M, and/or the one or more copies (e.g., 410) stored in non-volatile SSD memory of the one or more data structures 160 and/or (2) performing, at least in part, one or more RAID consistency checks based at least in part upon the information thus retrieved. Alternatively or additionally, one or more hosts 10 and/or HBA 13 may perform, at least in part, such checks.

For example, based at least in part upon the retrieved information from the one or more copies of the one or more data structures 160, the circuitry 118, storage 140, RAID 184, and/or SSD 192A ... 192M may determine whether there are any logical stripes in the RAID 184 that do not have all of their respective physical addresses recorded in the one or more copies of the one or more data structures 160, since this may indicate that one or more write transactions directed to such logical stripes may not have completed successively. In this situation, circuitry 118, storage 140, RAID 184, and/or SSD 192A ... 192M may examine the one or more data structures 172A ... 172M to determine whether there are any entries (e.g., 210A) that may correspond, at least in part, to one or more logical addresses (e.g., 137A and/or 136A) that may correspond, at least in part, to any such thus determined logical stripes. If any such entries 210A are determined to exist, circuitry 118, storage 140, RAID 184, and/or SSD 192A ... 192M may perform one or more RAID consistency checks on the data for the corresponding particular stripe or stripes, at one or more corresponding physical addresses (e.g., 138A, 139A, 198A, ... 199A) for the particular stripe or stripes, as specified in the one or more copies (e.g., 410) of the one or more data structures 160. In the event that it is determined that the data in any such stripe is inconsistent, one or more hosts 10 and/or HBA 13 may issue one or more commands/requests (e.g., 460) that, when executed, may result in circuitry 118, storage 140, RAID 184, and/or SSD 192A ... 192M modifying, at least in part, one or more data structures 160 (and/or one or more copies 410 thereof) such that the one or more physical addresses (e.g., 138B, 139B, 198B, ... 199B) that are correlated to the particular inconsistent stripe's one or more logical addresses (e.g., 136A, 137A, 194A, ... 195A) in one or more data structures 172, 172A, 172B ... 172M are used to overwrite the one or more physical addresses that are presently correlated in one or more data structures 160 and/or one or more copies 410 to such one or more logical addresses.

Thus, in the above example, in the recovery mode, the one or more storage-recovery-related operations that may be performed, at least in part, by circuitry 118, storage 140, RAID 184, and/or SSD 192A ... 192M may comprise performing one or more RAID consistency checks for a particular stripe only if the particular stripe corresponds, at least in part, to one or more physical addresses indicated in the one or more data structures 172, 172A ... 172M. Additionally or alternatively, such operations may comprise leaving unmodified any RAID stripe that does not correspond, at least in part, to any physical address recorded in the one or more data structures 172, 172A ... 172M. Additionally or alternatively, such operations may comprise modifying, at least in part, the one or more data structures 160 (and/or one or more copies 410 thereof) such that one or more physical addresses from the one or more data structures 172, 172A ... 172M are used to overwrite one or more physical addresses in the one or more data structures 160 and/or one or more copies 410 thereof.

Additionally or alternatively, without departing from this embodiment, depending upon the RAID level of RAID 184 (e.g., in the case of RAID level 6 implementation), if only one of two parity blocks for a given stripe is inconsistent, then the inconsistent parity block may be overwritten with the consistent parity block. The given stripe may be then considered consistent. Additionally or alternatively, if any stripe or portion thereof is unreadable, at least in part, the stripe or portion thereof may be considered inconsistent.

Additionally or alternatively, without departing from this embodiment, the blocks in RAID 184 may comprise sectors and/or pages. In such a case, multiple respective sets of entries in the data structures 160, 410, 172, 172A ... 172M may be employed for correlations that may embrace single respective sectors and/or pages. If any portion of a sector and/or page is determined to be inconsistent, then the entire page and/or sector may be deemed to be inconsistent.

Advantageously, the use of central caching (e.g., in the host 10 and/or HBA 13) of new stripes while their corresponding data blocks are being written to disk may be obviated in this embodiment. Advantageously, this may obviate, in this embodiment, the use of (e.g., non-volatile) cache memory for such purposes, as well as, the cost of such cache memory and latency associated moving data through such cache memory. Further advantageously, since such central caching may be obviated in this embodiment, this embodiment may be implemented using multiple HBA without the cost and complexity that otherwise would obtain.

Thus, in a first example in this embodiment, an apparatus is provided that may be used in association with a host. The apparatus may comprise circuitry that may be comprised, at least in part, in storage. The circuitry may perform operations that may satisfy condition (a) and/or condition (b). In condition (a), the circuitry may maintain at least one journal to record information that is related, at least in part, to at least one transaction. The at least one transaction may result in writing to at least one logical address and at least one physical address of the storage. The information may be recorded in the at least one journal via at least one atomic operation that may be executed prior to recording, at least in part, the information in at least one data structure that may correlate, at least in part, the at least one logical address to the at least one physical address. The information may facilitate, at least in part, at least one storage-recovery-related operation.

In condition (b), the circuitry may maintain at least one other data structure that may indicate at least one correlation between at least one other physical address and the at least one logical address. The at least one correlation may be valid prior to completion of the at least one transaction, but the at least one correlation may no longer be valid after the completion.

In a second example of this embodiment that may comprise some or all of the elements of the first example, the host may comprise at least one host processor. Also in this second example, the circuitry may permit offloading to the circuitry from the host of performance of the operations that may satisfy conditions (a) and/or (b). In this second example, the at least one journal, the at least one data structure, and the at least one other data structure may be comprised, at least in part, in the storage, and the storage may comprises at least one SSD.

In a third example of this embodiment that may comprise some or all of the elements of either of the first and second examples, the storage may comprise, at least in part, a RAID. The RAID may comprise a plurality of SSD that may have respective sets of logical addresses and respective sets of physical addresses. The respective identical logical addresses of the respective drives may correspond to respective stripes of the RAID. The at least one other data structure may comprise respective data structures in the respective drives. The respective data structures may indicate respective correlations between respective subsets of the respective sets of logical and physical addresses of the respective drives. In this third example, the circuitry may maintain, until released to be overwritten, for and in each respective drive, backup copies of data stored in the respective subsets of the respective sets of physical addresses that previously were indicated in the at least one data structure as being correlated to the respective subsets of the respective sets of logical addresses.

In a fourth example of this embodiment that may comprise some or all of the elements of the third example, for and in each respective drive, the respective subsets of the respective sets of physical and logical addresses may be indicated in at least one circular buffer as being correlated to each other. The at least one circular buffer may have a number of entries that may be greater than or equal to a largest permitted number of contemporaneous outstanding write transactions involving the respective drive.

In a fifth example of this embodiment that may comprise some or all of the elements of any of the preceding examples, the information may be written into the at least one journal after, at least in part, data is written to the at least one physical address that may be associated, at least in part, with the at least one transaction. In this fifth example, the storage may comprise, at least in part, a RAID that may be accessible via the at least one logical address and the at least one physical address. The RAID may have stripes. Each of the stripes may comprise at least one respective data block and at least one respective parity block. The information may be used, at least in part, to facilitate determination of whether at least one data block of at least one of the stripes is consistent with at least one parity block of the at least one of the stripes, based at least in part upon a RAID consistency check technique.

In a sixth example of this embodiment that may comprise some or all of the elements of the fifth example, the information may comprise at least one entry of the at least one data structure. The at least one entry may comprise the at least one logical address and the at least one physical address. In this sixth example, the at least one journal may be stored, at least in part, in at least one volatile memory. The RAID may comprise at least one non-volatile solid state drive to store at least one copy, at least in part, of the at least one journal. The at least one data structure may be stored, at least in part, in the at least one volatile memory. The at least one non-volatile solid state drive may store at least one copy, at least in part, of the at least one data structure.

In a seventh example of this embodiment that may comprise some or all of the elements of any of the preceding examples, the circuitry may satisfy one or more of the following conditions (i) to (vii). In the condition (i) the circuitry may record, at least in part, in the at least one journal, metadata and/or at least one identifier. The metadata may be associated, at least in part, with the at least one transaction. The at least one identifier may be associated, at least in part, with one or more of: the at least one transaction, multiple entries in the at least one journal, multiple transactions involving the storage that are associated with an identical respective transaction identifier, and/or a respective count of committed ones of the multiple transactions.

In condition (ii), in response, at least in part, to at least one request, the circuitry may retrieve, at least in part, one or more of the following: the at least one journal, respective data referenced by the at least one physical address and the at least one other physical address, the metadata, and/or the at least one identifier. In condition (iii), after all of the multiple entries have been recorded in the at least one journal, the circuitry may record the multiple entries in the at least one data structure.

In condition (iv), the metadata may comprise cache metadata that may describe, at least in part, at least one data block cached in a cache memory. In condition (v), the at least one storage-recovery-related operation may comprise modifying, at least in part, the at least one data structure such that the at least one other physical address from the at least one other data structure is used to overwrite the at least one physical address in the at least one data structure.

In condition (vi), the at least one storage-recovery-related operation may comprise performing at least one RAID consistency check for a particular stripe only if the particular stripe corresponds, at least in part, to one or more physical addresses indicated in the at least one other data structure. In condition (vii), the at least one storage-recovery-related operation may comprise leaving unmodified any RAID stripe that does not correspond, at least in part, to any physical address recorded in the at least one other data structure.

In an eighth example of this embodiment, computer-readable memory is provided that stores one or more instructions that when executed by a machine results in the performance of operations that may comprise (1) the operations that may be performed by the circuitry of the apparatus, and/or (2) any combination of any of the operations performed by the circuitry and/or apparatus in any of the preceding examples. In a ninth example of this embodiment, a method is provided for use in association with the host. The method of this ninth example may comprise (1) the operations that may be performed by the circuitry of the apparatus, (2) any combination of any of the operations performed by the circuitry and/or apparatus in any of the preceding examples, and/or (3) any combination of any of the operations that may be performed by execution of the one or more instructions stored in the computer-readable memory of the eighth example of this embodiment.

In a tenth example of this embodiment, means may be provided to carry out any of, and/or any combination of, the operations that may be performed by the method, apparatus, computer-readable memory, and/or circuitry in any of the preceding examples.

Advantageously, in this embodiment, techniques may be implemented that may be less complex and/or less expensive to implement and/or maintain than may be the case in conventional techniques. Additionally, the techniques of this embodiment may be implemented without substantially involvement of the host and/or the host's operating system. Advantageously, this may significantly reduce the amounts of host and/or host operating system processing bandwidth consumed, and/or improve host and/or host operating system performance in this embodiment. Further advantageously, this embodiment may not suffer from the degraded system performance and/or other disadvantages and/or drawbacks that may result in conventional systems from the imposition of write barriers, especially if input/output command parallelism is employed.

Many alternatives, modifications, and/or variations are possible without departing from this embodiment. For example, in an eleventh example of this embodiment, machine-readable memory may be provided that may store instructions and/or design data, such as Hardware Description Language, that may define one or more subsets of the structures, circuitry, apparatuses, features, etc. described herein (e.g., in any of the preceding examples of this embodiment). Accordingly, the claims

What is claimed is:

1. An apparatus to be used in association with a host, the apparatus comprising:
   circuitry to be comprised, at least in part, in storage, the circuitry to perform at least one of the following subparagraphs (a) and (b):
   (a) maintain at least one journal to record information that is related, at least in part, to at least one transaction, the at least one transaction resulting in writing to at least one logical address and at least one physical address of the storage, the information to be recorded in the at least one journal via at least one atomic operation that is executed prior to recording, at least in part, the information in at least one data structure that correlates, at least in part, the at least one logical address to the at least one physical address, the information to facilitate, at least in part, at least one storage-recovery-related operation; and (b) maintain at least one other data structure that indicates at least one correlation between at least one other physical address and the at least one logical address, the at least one correlation being valid prior to completion of the at least one transaction, but the at least one correlation no longer being valid after the completion;

wherein:

the storage comprises, at least in part, respective drives having respective sets of physical addresses and respective sets of to logical addresses;

the at least one other data structure comprises respective data structures that indicate respective correlations between respective subsets of the respective sets of logical and physical addresses of the respective drives;

for each respective drive, the respective subsets of the respective sets of physical and logical addresses are indicated in at least one buffer as being correlated to each other; and the at least one buffer has a number of entries that is greater than or equal to a largest permitted number of contemporaneous outstanding write transactions involving the respective drive.

2. The apparatus of claim 1, wherein:
the host comprises at least one host processor;
the circuitry is to permit offloading of performance of the at least one of the subparagraphs (a) and (b) to the circuitry from the host;
the at least one journal, the at least one data structure, and the at least one other data structure are comprised, at least in part, in the storage; and
the storage comprises at least one solid state drive (SSD).

3. The apparatus of claim 1, wherein:
the drives are solid state drives (SSD);
the storage comprises, at least in part, a redundant array of independent disks (RAID);
the RAID comprises the (SSD);
respective identical logical addresses of the respective SSD correspond to respective stripes of the RAID;
the respective data structures are comprised in the respective SSD;
and
the circuitry is to maintain, until released to be overwritten, for and in each respective drive, backup copies of data stored in the respective subsets of the respective sets of physical addresses that previously were indicated in the at least one data structure as being correlated to the respective subsets of the respective sets of logical addresses.

4. The apparatus of claim 3, wherein:
in each respective drive, the at least one buffer comprises at least one circular buffer.

5. The apparatus of claim 1, wherein:
the information is to be written into the at least one journal after, at least in part, data is written to the at least one physical address that is associated, at least in part, with the at least one transaction;
the storage comprises, at least in part, a redundant array of independent disks (RAID) that is accessible via the at least one logical address and the at least one physical address;
the RAID has stripes;
each of the stripes comprises at least one respective data block and at least one respective parity block; and
the information is to be used, at least in part, to facilitate determination of whether at least one data block of at least one of the stripes is consistent with at least one parity block of the at least one of the stripes, based at least in part upon a RAID consistency check technique.

6. The apparatus of claim 5, wherein:
the information comprises at least one entry of the at least one data structure, the at least one entry comprising the at least one logical address and the at least one physical address;
the at least one journal is stored, at least in part, in at least one volatile memory;
the RAID comprises at least one non-volatile solid state drive to store at least one copy, at least in part, of the at least one journal;
the at least one data structure is to be stored, at least in part, in the at least one volatile memory; and
the at least one non-volatile solid state drive is to store at least one copy, at least in part, of the at least one data structure.

7. The apparatus of claim 1, wherein:
the apparatus satisfies at least one of the following subparagraphs (i) to (vii):
(i) the circuitry is to record, at least in part, in the at least one journal, at least one of the following:
metadata associated, at least in part, with the at least one transaction, and
at least one identifier associated, at least in part, with one or more of: the at least one transaction, multiple entries in the at least one journal, and multiple transactions involving the storage that are associated with an identical respective transaction identifier, and a respective count of committed ones of the multiple transactions;
(ii) in response, at least in part, to at least one request, the circuitry is to retrieve, at least in part, at least one of the following:
the at least one journal,
respective data referenced by the at least one physical address and the at least one other physical address,
the metadata, and
the at least one identifier,
(iii) after all of the multiple entries have been recorded in the at least one journal, the circuitry is to record the multiple entries in the at least one data structure;
(iv) the metadata comprises cache metadata to describe, at least in part, at least one data block cached in a cache memory;
(v) the at least one storage-recovery-related operation comprises modifying, at least in part, the at least one data structure such that the at least one other physical address from the at least one other data structure is used to overwrite the at least one physical address in the at least one data structure;
(vi) the at least one storage-recovery-related operation comprises performing at least one RAID consistency check for a particular stripe only if the particular stripe corresponds, at least in part, to one or more physical addresses indicated in the at least one other data structure; and
(vii) the at least one storage-recovery-related operation comprises leaving unmodified any RAID stripe that does not correspond, at least in part, to any physical address recorded in the at least one other data structure.

8. A method usable in association with a host, the method comprising:
at least one of the following subparagraphs (a) and (b):
(a) maintaining, by circuitry, at least one journal, the circuitry being comprised, at least in part, in storage, the at least one journal being to record information that is related, at least in part, to at least one transaction, the at least one transaction resulting in writing to at least one logical address and at least one physical address of the storage, the information to be recorded in the at least one journal via at least one atomic operation that is executed prior to recording, at least in part, the information in at least one data structure that correlates, at least in part, the at least one logical address to the at least one physical address, the information to facilitate, at least in part, at least one storage-recovery-related operation; and
(b) maintaining, by the circuitry, at least one other data structure that indicates at least one correlation between at least one other physical address and the at least one logical address, the at least one correlation being valid prior to completion of the at least one transaction, but the at least one correlation no longer being valid after the completion;
wherein:
the storage comprises, at least in part, respective drives having respective sets of physical addresses and respective sets of to logical addresses;
the at least one other data structure comprises respective data structures that indicate respective correlations between respective subsets of the respective sets of logical and physical addresses of the respective drives;
for each respective drive, the respective subsets of the respective sets of physical and logical addresses are indicated in at least one buffer as being correlated to each other; and
the at least one buffer has a number of entries that is greater than or equal to a largest permitted number of contemporaneous outstanding write transactions involving the respective drive.

9. The method of claim 8, wherein:
the host comprises at least one host processor;
the circuitry is to permit offloading of performance of the at least one of the subparagraphs (a) and (b) to the circuitry from the host;
the at least one journal, the at least one data structure, and the at least one other data structure are comprised, at least in part, in the storage; and
the storage comprises at least one solid state drive (SSD).

10. The method of claim 8, wherein:
the drives are solid state drives (SSD);
the storage comprises, at least in part, a redundant array of independent disks (RAID);
the RAID comprises the SSD;
respective identical logical addresses of the respective SSD correspond to respective stripes of the RAID;
the respective data structures are comprised in the respective SSD; and
the circuitry is to maintain, until released to be overwritten, for and in each respective drive, backup copies of data stored in the respective subsets of the respective sets of physical addresses that previously were indicated in the at least one data structure as being correlated to the respective subsets of the respective sets of logical addresses.

11. The method of claim 10, wherein:
in each respective drive, the at least one buffer comprises at least one circular buffer.

12. The method of claim 8, wherein:
the information is to be written into the at least one journal after, at least in part, data is written to the at least one physical address that is associated, at least in part, with the at least one transaction;
the storage comprises, at least in part, a redundant array of independent disks (RAID) that is accessible via the at least one logical address and the at least one physical address;
the RAID has stripes;
each of the stripes comprises at least one respective data block and at least one respective parity block; and
the information is to be used, at least in part, to facilitate determination of whether at least one data block of at least one of the stripes is consistent with at least one parity block of the at least one of the stripes, based at least in part upon a RAID consistency check technique.

13. The method of claim 12, wherein:
the information comprises at least one entry of the at least one data structure, the at least one entry comprising the at least one logical address and the at least one physical address;
the at least one journal is stored, at least in part, in at least one volatile memory;
the RAID comprises at least one non-volatile solid state drive to store at least one copy, at least in part, of the at least one journal;
the at least one data structure is to be stored, at least in part, in the at least one volatile memory; and
the at least one non-volatile solid state drive is to store at least one copy, at least in part, of the at least one data structure.

14. The method of claim 8, wherein:
the method satisfies at least one of the following subparagraphs (i) to (vii):
(i) the circuitry is to record, at least in part, in the at least one journal, at least one of the following:
metadata associated, at least in part, with the at least one transaction, and
at least one identifier associated, at least in part, with one or more of: the at least one transaction, multiple entries in the at least one journal, and multiple transactions involving the storage that are associated with an identical respective transaction identifier, and a respective count of committed ones of the multiple transactions;
(ii) in response, at least in part, to at least one request, the circuitry is to retrieve, at least in part, at least one of the following:
the at least one journal,
respective data referenced by the at least one physical address and the at least one other physical address,
the metadata, and
the at least one identifier,
(iii) after all of the multiple entries have been recorded in the at least one journal, the circuitry is to record the multiple entries in the at least one data structure;
(iv) the metadata comprises cache metadata to describe, at least in part, at least one data block cached in a cache memory;

(v) the at least one storage-recovery-related operation comprises modifying, at least in part, the at least one data structure such that the at least one other physical address from the at least one other data structure is used to overwrite the at least one physical address in the at least one data structure;

(vi) the at least one storage-recovery-related operation comprises performing at least one RAID consistency check for a particular stripe only if the particular stripe corresponds, at least in part, to one or more physical addresses indicated in the at least one other data structure; and (vii) the at least one storage-recovery-related operation comprises leaving unmodified any RAID stripe that does not correspond, at least in part, to any physical address recorded in the at least one other data structure.

15. Computer-readable memory storing one or more instructions that when executed by a machine result in performance of operations comprising:

at least one of the following subparagraphs (a) and (b):

(a) maintaining, by circuitry, at least one journal, the circuitry being comprised, at least in part, in storage, the storage being associated at least in part with a host, the at least one journal being to record information that is related, at least in part, to at least one transaction, the at least one transaction resulting in writing to at least one logical address and at least one physical address of the storage, the information to be recorded in the at least one journal via at least one atomic operation that is executed prior to recording, at least in part, the information in at least one data structure that correlates, at least in part, the at least one logical address to the at least one physical address, the information to facilitate, at least in part, at least one storage-recovery-related operation; and (b) maintaining, by the circuitry, at least one other data structure that indicates at least one correlation between at least one other physical address and the at least one logical address, the at least one correlation being valid prior to completion of the at least one transaction, but the at least one correlation no longer being valid after the completion;

wherein:

the storage comprises, at least in part, respective drives having respective sets of physical addresses and respective sets of to logical addresses;

the at least one other data structure comprises respective data structures that indicate respective correlations between respective subsets of the respective sets of logical and physical addresses of the respective drives;

for each respective drive, the respective subsets of the respective sets of physical and logical addresses are indicated in at least one buffer as being correlated to each other; and the at least one buffer has a number of entries that is greater than or equal to a largest permitted number of contemporaneous outstanding write transactions involving the respective drive.

16. The computer-readable memory of claim 15, wherein:
the host comprises at least one host processor;
the circuitry is to permit offloading of performance of the at least one of the subparagraphs (a) and (b) to the circuitry from the host;

the at least one journal, the at least one data structure, and the at least one other data structure are comprised, at least in part, in the storage; and
the storage comprises at least one solid state drive (SSD).

17. The computer-readable memory of claim 15, wherein:
the drives are (SSD);
the storage comprises, at least in part, a redundant array of independent disks (RAID);
the RAID comprises the SSD;
respective identical logical addresses of the respective SSD correspond to respective stripes of the RAID;
the respective data structures are comprised in the respective SSD;
and
the circuitry is to maintain, until released to be overwritten, for and in each respective drive, backup copies of data stored in the respective subsets of the respective sets of physical addresses that previously were indicated in the at least one data structure as being correlated to the respective subsets of the respective sets of logical addresses.

18. The computer-readable memory of claim 17, wherein:
in each respective drive, the at least one buffer comprises at least one circular buffer.

19. The computer-readable memory of claim 15, wherein:
the information is to be written into the at least one journal after, at least in part, data is written to the at least one physical address that is associated, at least in part, with the at least one transaction;
the storage comprises, at least in part, a redundant array of independent disks (RAID) that is accessible via the at least one logical address and the at least one physical address;
the RAID has stripes;
each of the stripes comprises at least one respective data block and at least one respective parity block; and
the information is to be used, at least in part, to facilitate determination of whether at least one data block of at least one of the stripes is consistent with at least one parity block of the at least one of the stripes, based at least in part upon a RAID consistency check technique.

20. The computer-readable memory of claim 19, wherein:
the information comprises at least one entry of the at least one data structure, the at least one entry comprising the at least one logical address and the at least one physical address;
the at least one journal is stored, at least in part, in at least one volatile memory;
the RAID comprises at least one non-volatile solid state drive to store at least one copy, at least in part, of the at least one journal;
the at least one data structure is to be stored, at least in part, in the at least one volatile memory; and
the at least one non-volatile solid state drive is to store at least one copy, at least in part, of the at least one data structure.

21. The computer-readable memory of claim 15, wherein:
the operations satisfy at least one of the following subparagraphs (i) to (vii):
(i) the circuitry is to record, at least in part, in the at least one journal, at least one of the following:
metadata associated, at least in part, with the at least one transaction, and
at least one identifier associated, at least in part, with one or more of: the at least one transaction, multiple entries in the at least one journal, and multiple transactions involving the storage that are associated with an identical respective transaction identifier, and a respective count of committed ones of the multiple transactions;

(ii) in response, at least in part, to at least one request, the circuitry is to retrieve, at least in part, at least one of the following:
the at least one journal,
respective data referenced by the at least one physical address and the at least one other physical address,
the metadata, and
the at least one identifier;

(iii) after all of the multiple entries have been recorded in the at least one journal, the circuitry is to record the multiple entries in the at least one data structure;

(iv) the metadata comprises cache metadata to describe, at least in part, at least one data block cached in a cache memory;

(v) the at least one storage-recovery-related operation comprises modifying, at least in part, the at least one data structure such that the at least one other physical address from the at least one other data structure is used to overwrite the at least one physical address in the at least one data structure;

(vi) the at least one storage-recovery-related operation comprises performing at least one RAID consistency check for a particular stripe only if the particular stripe corresponds, at least in part, to one or more physical addresses indicated in the at least one other data structure; and (vii) the at least one storage-recovery-related operation comprises leaving unmodified any RAID stripe that does not correspond, at least in part, to any physical address recorded in the at least one other data structure.

* * * * *